(12) United States Patent
Abou-Akar et al.

(10) Patent No.: US 7,692,354 B2
(45) Date of Patent: Apr. 6, 2010

(54) ROTARY ELECTRIC MACHINE WITH REDUCED TORQUE RIPPLE

(75) Inventors: Atef Abou-Akar, l'Isle d'Espagnac (FR); Eric Coupart, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 0 days.

(21) Appl. No.: 11/594,057

(22) Filed: Nov. 8, 2006

(65) Prior Publication Data

US 2007/0126308 A1 Jun. 7, 2007

(30) Foreign Application Priority Data

Dec. 2, 2005 (FR) .................................. 05 53707

(51) Int. Cl.
*H02K 1/06* (2006.01)
(52) U.S. Cl. .............................. 310/216.111; 310/67 R; 310/156.45; 310/51; 310/156.26
(58) Field of Classification Search ................. 310/216, 310/67 R, 156.45, 51, 156.26, 216.111
See application file for complete search history.

(56) References Cited

U.S. PATENT DOCUMENTS

| 2,312,101 | A | * | 2/1943 | Merrill et al. ........... 310/156.38 |
| 4,491,769 | A | * | 1/1985 | Heidelberg ............ 318/400.41 |
| 4,924,125 | A | * | 5/1990 | Clark ....................... 310/67 R |
| 5,030,864 | A | * | 7/1991 | Van Hout et al. .......... 310/67 R |
| 5,138,213 | A |   | 8/1992 | Sottek |
| 5,977,680 | A | * | 11/1999 | Lin ..................... 310/216.092 |
| 2002/0130574 | A1 | * | 9/2002 | Takahata et al. ....... 310/156.53 |
| 2004/0140725 | A1 |   | 7/2004 | Takahashi |

FOREIGN PATENT DOCUMENTS

| EP | 1 104 077 A2 | 5/2001 |
| EP | 1 349 261 A2 | 10/2003 |
| FR | 2 802 724 | 6/2001 |
| GB | 2 345 586 A | 7/2000 |
| JP | A 07-308057 | 11/1995 |
| JP | A 10-164777 | 6/1998 |
| JP | 2001114486 A * | 4/2001 |
| JP | 2001119869 A * | 4/2001 |
| JP | 2004015880 A * | 1/2004 |
| WO | WO 03/052901 A1 | 6/2003 |

\* cited by examiner

*Primary Examiner*—Quyen Leung
*Assistant Examiner*—Alex W Mok
(74) *Attorney, Agent, or Firm*—Oliff & Berridge, PLC

(57) ABSTRACT

The present invention relates to a rotary electric machine comprising:
  a concentrated winding stator having teeth and coils placed on the teeth, the teeth having end faces that are convex towards the rotor; and
  a rotor comprising an armature defining a cylindrical surface and permanent magnets, the permanent magnets having inside faces that are cylinder portions matching the shape of the cylindrical surface of the armature, and outside faces that are plane and that face towards the stator.

17 Claims, 3 Drawing Sheets

ROTARY ELECTRIC MACHINE WITH REDUCED TORQUE RIPPLE

The present invention relates to rotary electric machines, and more particularly but not exclusively to those used for driving elevator cabins.

BACKGROUND

French patent FR 2 802 724 recalls that it is known to make an inner rotor having permanent magnets presenting faces that face towards the stator that are convex, and a stator having teeth presenting end faces that are concave towards the rotor.

That prior patent describes a rotary machine in which the end faces of the teeth are convex towards the rotor and the magnets present faces facing towards the stator that are cylindrical about the axis of rotation.

European patent application EP 1 349 261 discloses a motor for an elevator in which a stator has teeth provided with pole enlargements (or "pole shoes") and a rotor having permanent magnets.

It is desirable for the electric motors used for driving elevator cabins to generate as little vibration as possible, since the vibration is likely to be transmitted to the cabin, where it can disturb the comfort of passengers.

There exists a demand for reducing the overall size of motors, e.g. in order to make elevators easier to install.

A solution for achieving that object consists firstly in using motors without gearing or with a relatively small stepdown ratio, and secondly in causing the rotor to rotate more quickly.

Unfortunately, increasing the nominal speed increases the risk of encountering resonant frequencies both when operating at nominal speed and during starting and deceleration stages.

SUMMARY

Consequently, there exists a need to benefit from rotary electric machines presenting relatively small overall size, and that are capable of rotating at relatively high speed, while reducing noise and vibration.

In one of its aspects, the invention provides a rotary electric machine comprising:

- a stator having teeth and coils disposed on the teeth, the teeth having convex end faces facing towards the rotor; and
- a rotor including permanent magnets, the permanent magnets having plane faces facing towards the stator.

In some exemplary embodiments, the invention makes it possible to benefit from a machine in which torque ripple is relatively low while torque is relatively high.

The rotor may be an outer rotor, thus enabling it to rotate at a relatively high speed while limiting any risk of the magnets becoming detached, and also making it easier to drive elevator cables. In a variant, the rotor could be an inner rotor.

The magnets may optionally be constituted by single pieces.

The plane faces of the magnets are advantageously placed perpendicularly to radii passing through the axis of rotation and intersecting the magnets halfway along.

By way of example, the end faces of the teeth are cylindrical portions, having a radius of curvature that is smaller than the distance between the tips of the teeth and the axis of rotation.

The number of poles P of the rotor lies, for example, in the range 8 to 32 and the number of teeth S of the stator lies, for example, in the range 12 to 48. The relationship between the number of rotor poles and stator teeth may, for example, satisfy one of the following relationships:

$S/P=3/2$ or $S/P=3/4$;

$S=6n$ $P=6n\pm2$ where $n$ is an integer greater than or equal to 1;

$S=3(2n+1)$ and $P=2(4n+3)$ where $n$ is an integer greater than or equal to 1;

$S=3n$ and $P=(3\pm1)n$ where $n$ is an integer greater than or equal to 1;

$S=2n$ and $P=2(2n\pm1)$ where $n$ is an integer greater than or equal to 2;

$S=10n$ and $P=2(5n\pm1)$;

$S=6n$ and $P=2(3n\pm3)$.

The stator teeth may have first axial ends and second axial ends that are angularly offset relative to the first ends.

Such an offset contributes to reducing torque ripple when the teeth do not have pole shoes, as is the case for a stator with concentrated winding.

The angular offset may be greater than or equal to $0.9\times 2\pi/3P$, better equal to $2\pi/3P$, where P designates the number of rotor poles.

The angular offset may be greater than or equal to $0.9\times\pi/S$, better equal to $\pi/S$, where S designates the number of stator slots, and providing $\pi/S$ is greater than $2\pi/3P$.

In another of its aspects, the invention also provides a method of driving an elevator cabin, the method comprising using a machine as defined above, without gearing or with a stepdown gear ratio less than or equal to 4.

The invention also provides an elevator including a machine as defined above for driving the cabin.

The invention can be better understood on reading the following detailed description of non-limiting embodiments thereof, and on examining the accompanying drawings, in which.

Figure 1:
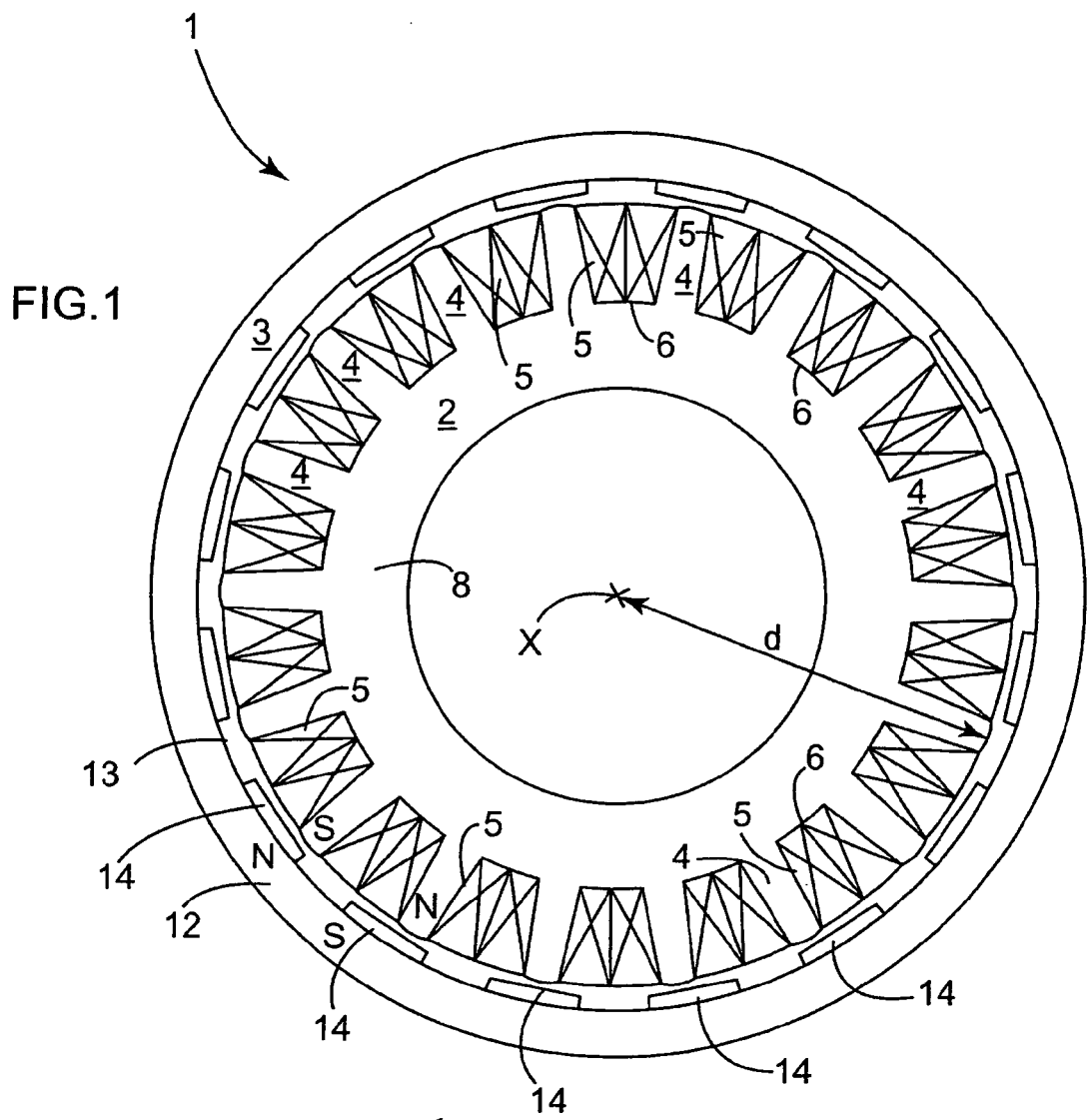
FIG. 1 is a diagrammatic view of a rotary machine of the invention.
Figure 2:
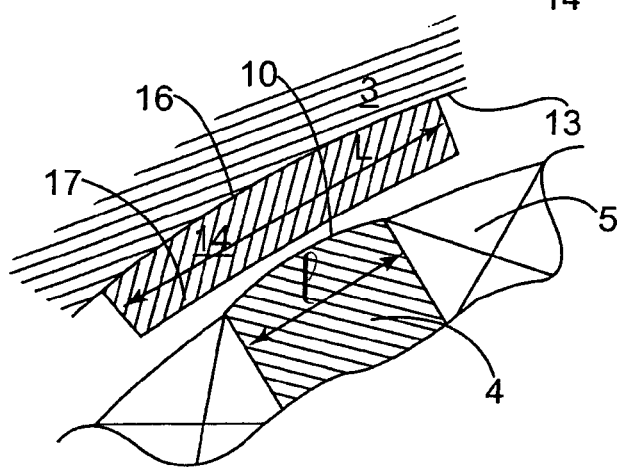
FIGS. 2 and 3 are fragmentary and diagrammatic sections of the FIG. 1 machine.
Figure 3:
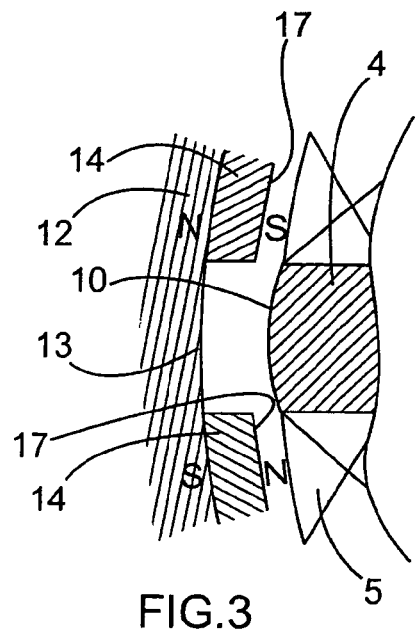

The rotary electric machine 1 shown in FIG. 1 comprises an inner stator 2 and an outer rotor 3 capable of rotating about an axis of rotation X.

The stator 2 has a plurality of teeth 4, e.g. eighteen teeth, with respective coils 5 placed thereon, the stator 2 being of the concentrated winding type, for example.

The teeth 4 do not have any pole shoes.

By way of example, the coils 5 are fabricated separated and are engaged on the teeth 4 after they have been fabricated.

The stator 2 may include pieces of shim (not shown) to close the slots 6 that receive the coils 5.

In the example described, the teeth 4 are connected to an annular yoke 8.

By way of example, the teeth 4 and the yoke 8 comprise a stack of varnished magnetic laminations. Each lamination has as many slots and teeth as the stator, for example. In a variant, the teeth 4 are carried on assembled-together sectors.

Figure 5:
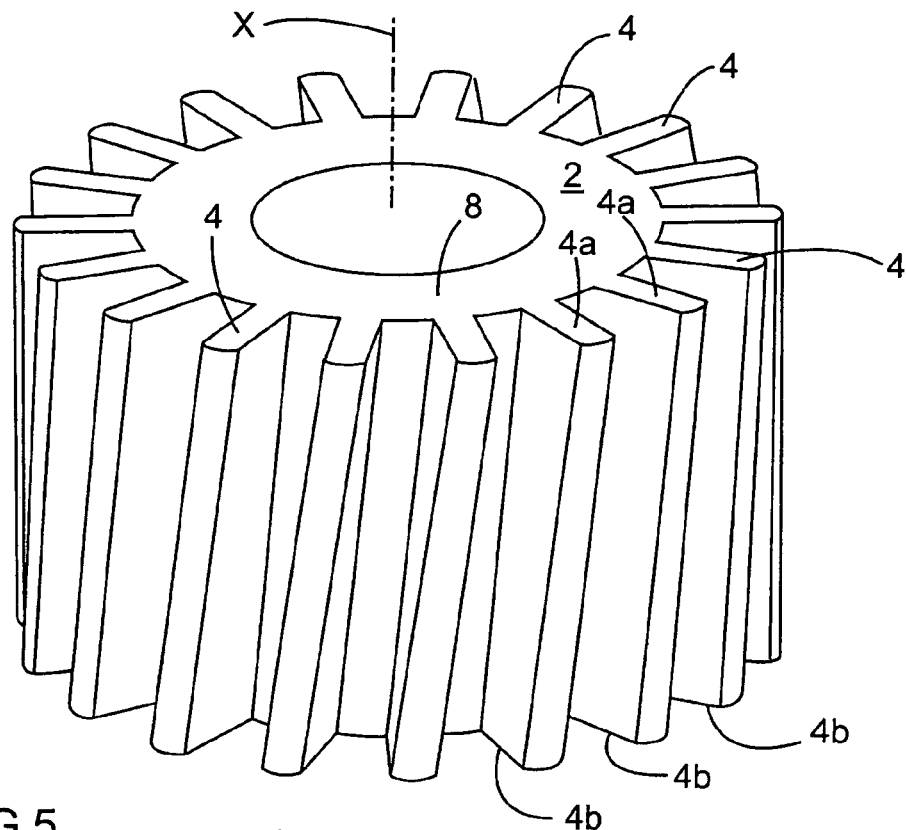
FIGS. 5 and 6 are diagrams showing the stator in isolation, respectively in perspective and in plan view.
Figure 6:
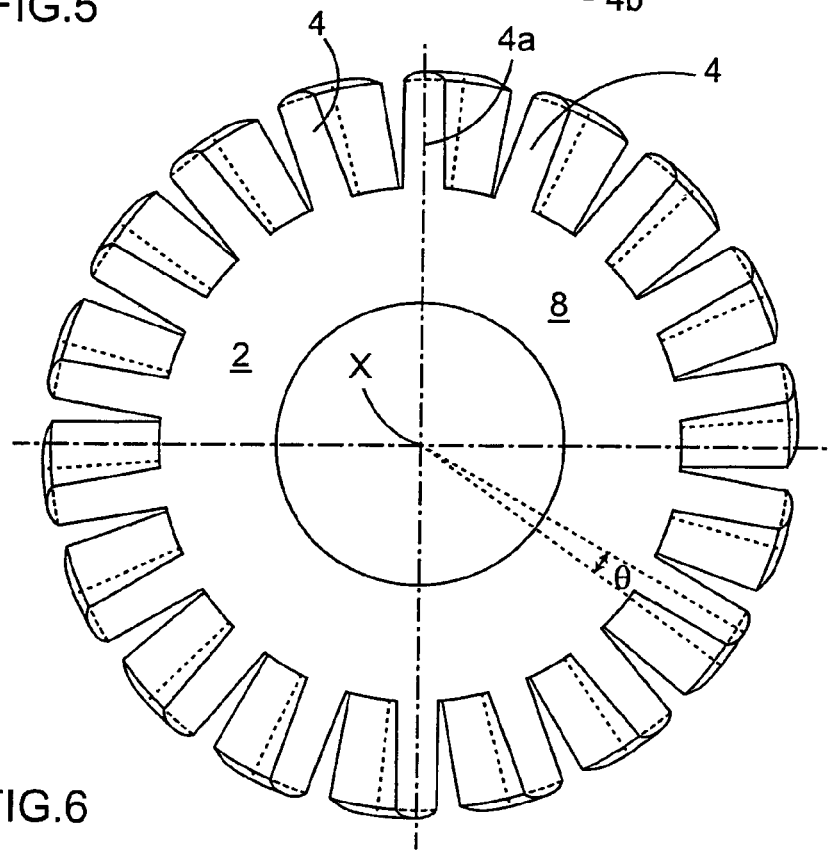

The teeth 4 are preferably inclined as shown in FIGS. 5 and 6.

The teeth present first axial ends 4a that are angularly offset relative to opposite second axial ends 4b about the axis of rotation X.

By way of example, the offset θ is equal to 2π/3P where P designates the number of poles of the rotor.

Where appropriate, for example in order to mitigate the effects of shapes that depart geometrically from being accurately concentric, this value could be increased up to π/S, where S designates the number of slots in the stator, and providing that π/S is greater than 2π/3P.

The inclination of the teeth 4 of the stator further improves the reduction in torque oscillations in the absence of pole shoes.

In an aspect of the invention, the teeth 4 present end faces 10 that are convex towards the rotor 3. By way of example, these end faces are in the shape of a portion of a cylinder, having generator lines parallel to the axis X and having a radius of curvature that is smaller than the distance d between the axis X and the tips of the teeth 4. By way of example, the radius of curvature is equal to 0.5 to 0.7 times this distance d.

The rotor 3 revolves in bearings that are not shown.

The rotor 3 comprises an annular armature 12 having a radially inner surface 13 with permanent magnets 14 secured thereto, e.g. sixteen permanent magnets.

By way of example, the armature 12 is made up of a stack of varnished magnetic laminations.

By way of example, the radially inner surface 13 is a circular cylinder about the axis X and the magnets 14 present inside faces 16 that are portions of a cylinder, being shaped to match substantially the shape of the radially inner surface 13 of the armature 12. By way of example, the magnets are bonded to the armature 12 by means of adhesive on their faces 16.

The cylindrical surfaces 16 of the magnets enable a relatively large bonding area to be obtained, and thus provide good mechanical strength.

In the example shown, each magnet 14 presents an outside face 17 facing towards the stator that is plane.

The outside faces 17 of the magnets 14 are perpendicular to radii passing through the axis X and intersecting the magnets 14 halfway along.

In the example shown, the magnets 14 are single pieces, but it would not go beyond the ambit of the invention for the magnets 14 to be fragmented, e.g. for the purpose of reducing losses by induced currents.

The magnets 14 are magnetized in a substantially radial direction, and the polarities of the magnets 14 alternate in the circumferential direction.

The longitudinal direction L of the magnets lies in the range 1.5 to 2.5 times the width l of the teeth 4, for example.

The variation in the width of the airgap between the end faces 10 and the outside faces 17 makes it possible to benefit from torque that is relatively high, while reducing ripple in the torque.

As a result, the noise and vibration generated by the machine are of relatively low level.

One or more elevator cables can be driven without gearing, at least one pulley groove being formed on the outer rotor or the rotor being coupled to a pulley, for example. In a variant, the rotor may drive the pulley via a stepdown gearbox with a relatively small stepdown ratio, e.g. 1 to 4.

In order to drive an elevator cabin, the nominal speed of rotation lies for example in the range 48 revolutions per minute (rpm) to 355 rpm.

Figure 4:
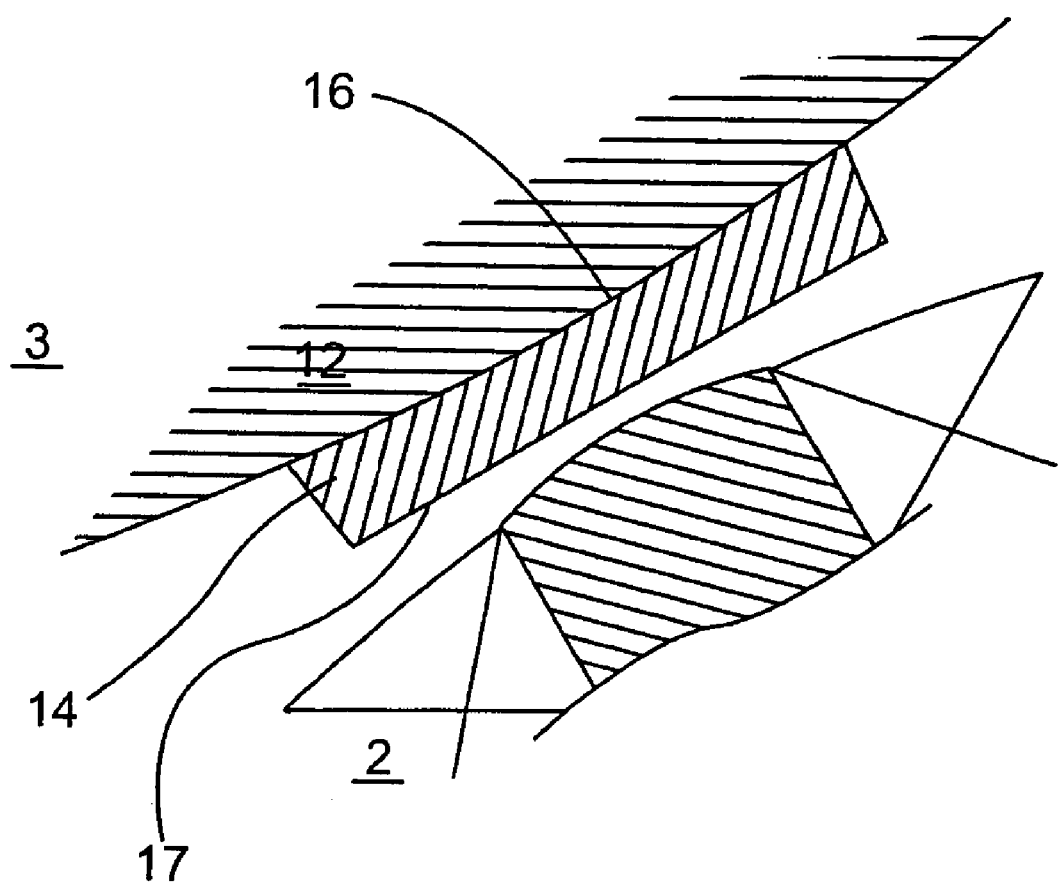
FIG. 4 is a view analogous to FIG. 2 showing a variant embodiment of the invention.

The rotor 3 could also be an inner rotor, as shown in FIG. 4. Under such circumstances, each magnet 14 presents an outside face 17 facing towards the stator that is substantially plane and perpendicular to a radius passing through the axis of the rotor and intersecting the magnet halfway along.

The magnets 14 may present respective inside faces 16 facing away from the stator that are concave, matching the shape of the rotor armature 12.

The invention is not limited to the examples described above and, for example, the rotor may have some other number of poles, and likewise the stator may have some other number of teeth.

The machine can be used not only as a motor, but also as a generator, e.g. for the purpose of recovering energy.

The machine can find applications other than driving an elevator cabin.

The term "comprising a" should be understood as being synonymous with "comprising at least one", unless specified to the contrary.

Although the present invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A rotary electric machine comprising:
a stator with a concentrated winding, comprising teeth having no pole shoes and coils placed on the teeth, the teeth having end faces that are convex towards a rotor; and
the rotor comprising an armature defining a cylindrical surface and permanent magnets having inside faces forming cylinder portions matching a shape of the cylindrical surface of the armature and having outside faces opposed to the inside faces, the outside faces being plane and facing towards the stator, the outside faces delimiting an air gap with the teeth of the stator,
wherein the end faces of the teeth form cylinder portions presenting a radius of curvature which lies in the range 0.5 d to 0.7 d, where d is the distance between tips of the teeth and an axis of rotation of the rotor.

2. An electric machine according to claim 1, in which the rotor is an outer rotor.

3. An electric machine according to claim 1, in which the rotor is an inner rotor.

4. An electric machine according to claim 1, in which the magnets are single pieces.

5. A machine according to claim 1, in which the outside plane faces of the magnets are perpendicular to radii passing through an axis of rotation of the rotor and intersecting the magnets halfway along.

6. A machine according to claim 1, having a number of rotor poles lying in the range 8 to 32.

7. A machine according to claim 1, having a number of stator teeth lying in the range 12 to 48.

8. A machine according to claim 1, in which the stator teeth have axial first ends and axial second ends that are angularly offset from the first ends.

9. A machine according to claim 8, in which the angular offset is greater than or equal 0.9×2π/3P where P designates the number of poles of the rotor.

10. A machine according to claim 8, in which the angular offset is 2π/3P.

11. A machine according to claim 8, in which the angular offset is greater than or equal to 0.9×π/S, where S designates the number of stator slots, providing $\pi/S$ is greater than $2\pi/3P$, where P designates the number of rotor poles.

12. A machine according to claim 11, in which the angular offset is equal to $\pi/S$.

13. A machine according to claim 1, in which the magnets have their inside faces bonded to the cylindrical surface of the armature by adhesive.

14. A method of driving an elevator cabin, comprising using a machine as defined above in claim 1.

15. A method according to claim 14, in which the machine is used without gearing.

16. A method according to claim 14, in which the machine is used with a stepdown gear ratio less than or equal to 4.

17. An elevator including a cabin driven by a machine as defined in claim 1.

* * * * *